United States Patent
Manning et al.

(10) Patent No.: US 6,270,317 B1
(45) Date of Patent: Aug. 7, 2001

(54) TURBINE NOZZLE WITH SLOPED FILM COOLING

(75) Inventors: Robert F. Manning, Newburyport; Gene C. F. Tsai, Lexington; Anthony D. Di Bello, Ipswich, all of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/466,154

(22) Filed: Dec. 18, 1999

(51) Int. Cl.[7] .................................................. F04D 29/58
(52) U.S. Cl. .................................... 416/97 R; 416/DIG. 2
(58) Field of Search .................................... 415/115, 116; 416/96 R, 96 A, 97 R, 97 A

(56) References Cited

U.S. PATENT DOCUMENTS

| 5,462,405 | * | 10/1995 | Hoff et al. | 416/97 R |
| 5,609,466 | * | 3/1997 | North et al. | 415/115 |
| 5,931,638 | * | 8/1999 | Krause et al. | 415/115 |

* cited by examiner

Primary Examiner—F. Daniel Lopez
Assistant Examiner—James M. McAleenan
(74) Attorney, Agent, or Firm—Andrew C. Hess; Rodney M. Young

(57) ABSTRACT

A turbine nozzle vane includes pressure and suction sidewalls extending between leading and trailing edges. The vane includes a pair of integral ribs defining three internal cooling channels between the leading and trailing edges. Rows of film cooling holes extend through the sidewalls, and three rows in the pressure side are inclined along the span of the airfoil at different slopes.

20 Claims, 3 Drawing Sheets

TURBINE NOZZLE WITH SLOPED FILM COOLING

BACKGROUND OF THE INVENTION

The present invention relates generally to gas turbine engines, and, more specifically, to turbine nozzles therein.

In a gas turbine engine, air is pressurized in a compressor and mixed with fuel and ignited in a combustor for generating hot combustion gases. The gases are discharged through a first stage high pressure turbine nozzle having stator vanes which direct the gases toward a row of turbine rotor blades extending radially outwardly from a supporting disk.

The turbine blades extract energy from the combustion gases and power the compressor. The gases are then channeled to a low pressure turbine typically having several stages of nozzle vanes and rotor blades which extract additional energy from the gases for producing output work such as powering a fan in a turbofan aircraft engine embodiment.

Since the high pressure turbine nozzle firstly receives the combustion gases from the combustor, it must be cooled for enjoying a suitable useful life. A typical turbine nozzle includes a row of airfoil vanes circumferentially spaced apart from each other and extending radially in span between outer and inner annular bands. The vanes are hollow for receiving therein a portion of compressor discharge air used for cooling the individual vanes.

Internal cooling channels are defined in each vane by corresponding radially extending ribs or partitions which integrally join together the circumferentially opposite pressure and suction sides of the vane. The inner surfaces of the vanes may include short turbulators which trip the cooling air flowing thereover during operation for enhancing heat transfer cooling therefrom.

In order to protect the external surface of the vanes from the hot combustion gases flowing thereover, various radial rows of film cooling holes are provided through the pressure and suction sides of the vane. Since the leading edge of the vane first receives the hot combustion gases, it typically includes several rows of film cooling holes in a showerhead configuration. The air discharged from the film cooling holes produces a boundary layer of cooling air along the external surface of the vane which is re-energized with additional cooling air from row-to-row. The film cooling air provides a barrier protecting the metal of the vane from the hot combustion gases during operation.

A typical vane airfoil increases in thickness aft of the leading edge to a maximum thickness typically within the first third of the chord length, and then tapers and narrows in thickness to a relatively thin trailing edge. As the vane thins near the trailing edge, the ability to cool the trailing edge region of the vane becomes more difficult. The trailing edge is thusly another region of the vane which experiences relatively high temperature during operation.

The trailing edge is typically cooled by a row of trailing edge discharge holes which provide internal convection cooling thereof. And, one or more rows of additional film cooling holes may be provided along the pressure sidewall for protecting the pressure sidewall and developing a cooling air film which extends downstream to the trailing edge for the additional protection thereof.

Furthermore, the suction sidewall may also include several rows of film cooling gill holes between the leading edge and the maximum thickness region which develop cooling air films for protecting the suction sidewall, and which flow to the trailing edge for the additional protection thereof.

Since the combustion gases flow with different velocities over the pressure and suction sidewalls of the vane, the various regions of the vane from leading to trailing edge are subject to different amounts of heating therefrom, and correspondingly require different amounts of cooling. Since any air diverted from the combustor for cooling the nozzle vanes decreases overall engine efficiency, the amount thereof should be minimized while obtaining a suitable useful life for the nozzle vanes.

The varying heating effect of the combustion gases, and the varying cooling effect of the cooling air further complicate vane design since temperature gradients are created. Temperature gradients cause differential expansion and contraction of the vane material, which in turn causes thermally induced strain and stress which affects the low cycle fatigue life of the vane during operation.

For example, partitions or ribs extend between the pressure and suction side of the vane to define corresponding cooling channels therein and are inherently relatively cold since they are protected inside the vane and cooled by the air channeled therealong. The ribs are relatively cold when compared with the relatively hot pressure and suction sidewalls of the vane, and a considerable temperature gradient is created therebetween. Furthermore, temperature gradients are also effected between the leading and trailing edges of the vane in different amounts along the pressure and suction sides.

Accordingly, the prior art is crowded with various configurations for cooling turbine nozzle vanes with different complexity and different degrees of effectiveness, and with different useful lives.

For example, General Electric Company has manufactured and sold one turbofan aircraft gas turbine engine designated as the CF34 model which has enjoyed decades of commercial success and use. The high pressure turbine nozzle of this engine includes film cooled vanes having a significant useful life. Decades of commercial use of this engine has provided thousands of hours of field experience for evaluating durability and life of the turbine nozzles therein.

Such field experience in conjunction with extensive analysis of this nozzle design may now be used for improving the durability and life of the turbine nozzle without increasing the amount of cooling air required therefor.

Accordingly, it is desired to provide an improved turbine nozzle based on extensive field experience and analysis having improved durability without requiring additional cooling airflow.

BRIEF SUMMARY OF THE INVENTION

A turbine nozzle vane includes pressure and suction sidewalls extending between leading and trailing edges. The vane includes a pair of integral ribs defining three internal cooling channels between the leading and trailing edges. Rows of film cooling holes extend through the sidewalls, and three rows in the pressure side are inclined along the span of the airfoil at different slopes.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
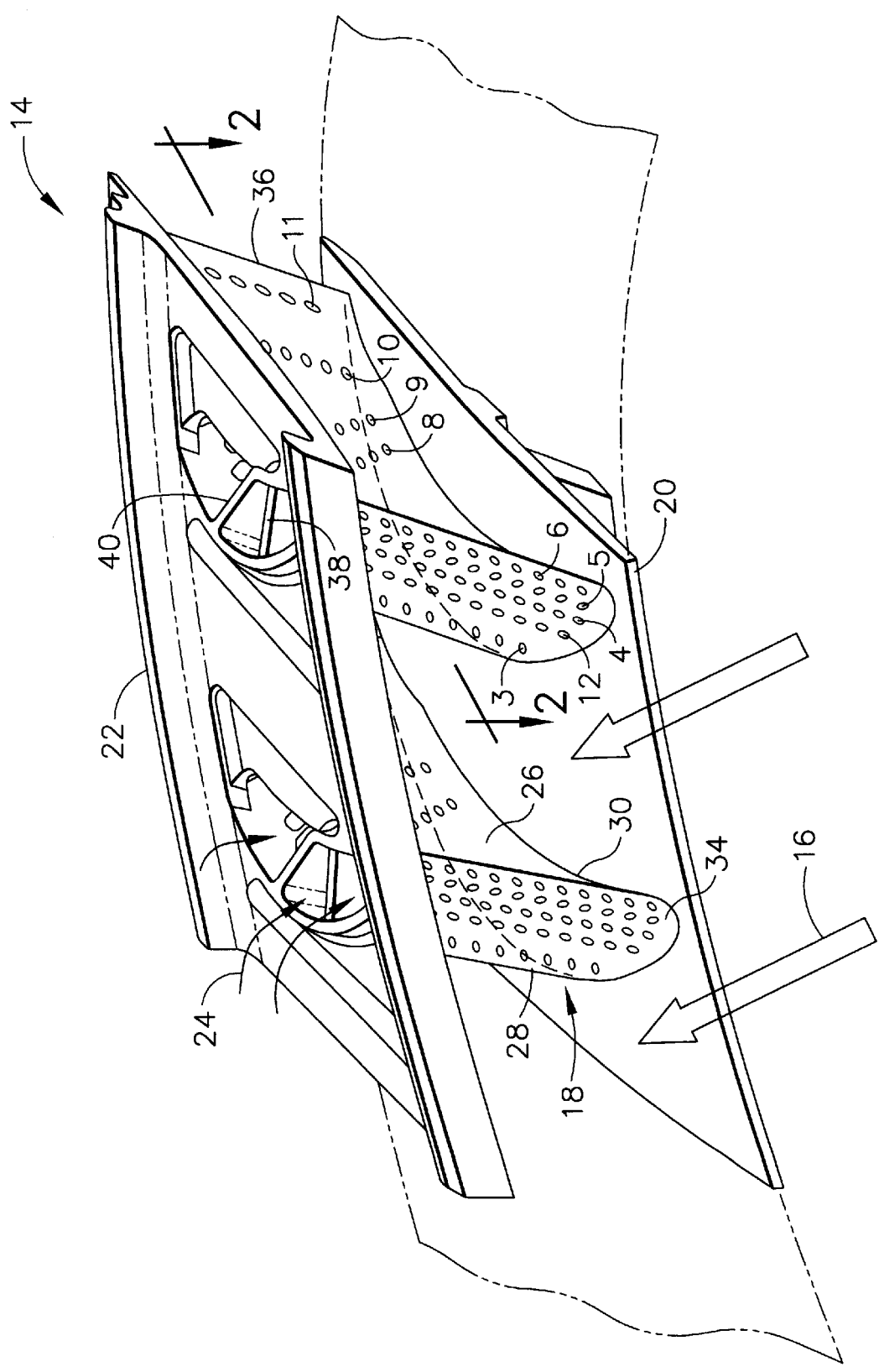
FIG. 1 is an isometric view of an arcuate segment of an annular gas turbine engine, high pressure turbine nozzle in accordance with an exemplary embodiment of the present invention.

Illustrated in FIG. 1 is a portion of a first stage, high pressure turbine nozzle 14 of a turbofan gas turbine engine configured for powering an aircraft in flight. The engine includes in serial flow communication a fan, multi-stage compressor, and combustor (not shown) which mixes fuel with pressurized air from the compressor for generating hot combustion gases 16 which are discharged through the nozzle.

Disposed downstream from the nozzle is a row of first stage turbine rotor blades (not shown), followed in turn by a low pressure turbine (not shown) which powers the fan during operation.

The turbine nozzle shown in part in FIG. 1 is asymmetrical about an axial centerline axis and includes a plurality of nozzle vanes 18 integrally joined at opposite radial ends to corresponding radially inner and outer bands 20,22. The bands are shown in part and are typically formed in arcuate segments having two or more vanes per segment. In order to cool the vanes during operation against the hot combustion gases 16, cooling air 24 is suitably diverted from the discharge end of the compressor and fed to the individual vanes typically through the outer band 22.

Figure 2:
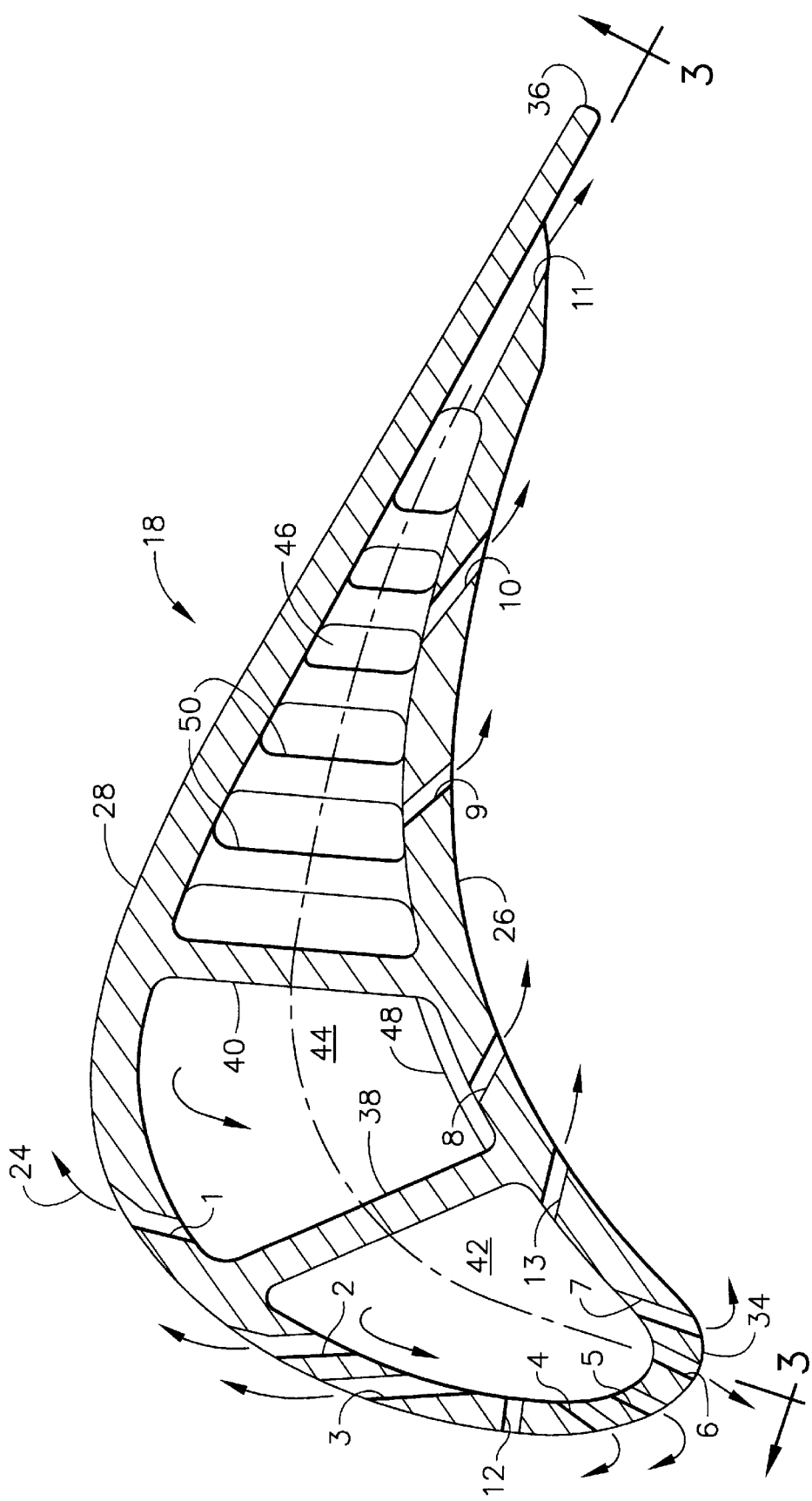
FIG. 2 is a radial sectional view through one of the nozzle vanes illustrated in FIG. 1 and taken along line 2—2.
Figure 3:
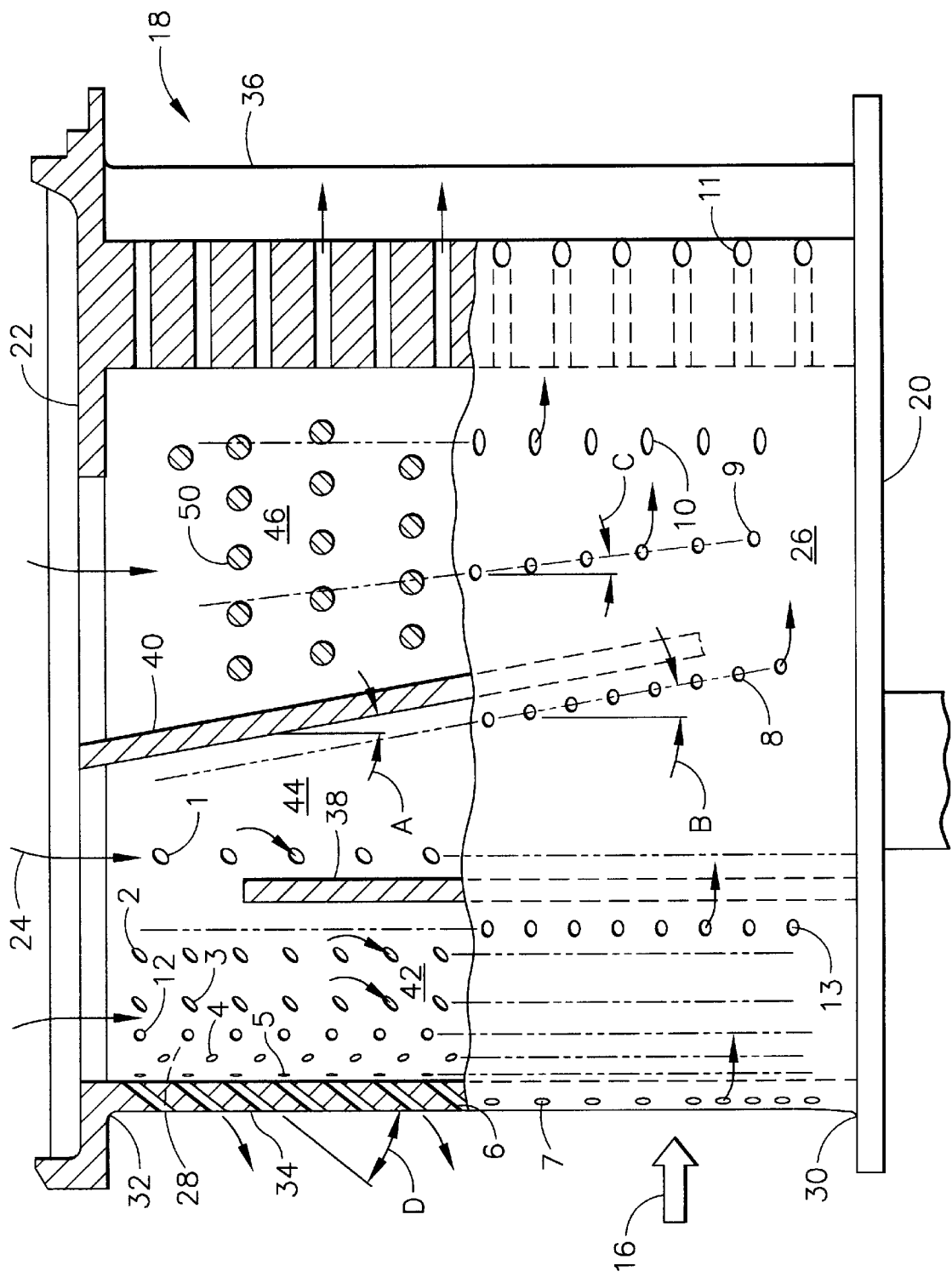
FIG. 3 is an axial elevational view through the nozzle vane illustrated in FIG. 1 and taken generally along the camber line 3—3.

As shown in FIGS. 1 and 2, each vane 18 includes a generally concave pressure sidewall 26, and a circumferentially opposite generally convex, suction sidewall 28. As shown in FIG. 3, the two sidewalls extend longitudinally in span along a radial axis of the nozzle between the two bands 20,22, with a root 30 joining the former, and a tip 32 joining the latter. The two sidewalls also extend chordally or axially between opposite leading and trailing edges 34,36.

As shown in FIGS. 2 and 3, the two vane sidewalls are circumferentially spaced apart from each other between the leading and trailing edges and include internal ribs or partitions formed integrally therewith, typically in a common casting. A first rib 38 is spaced aft from the leading edge, and a second rib 40 is spaced aft from the first rib and forward of the trailing edge.

The first rib defines with the leading edge region of the vane a first or leading edge channel 42 for channeling the cooling air 24 inside the vane. The second rib 40 is spaced from the first rib to define a second or mid-chord channel 44 which also channels a portion of the cooling air. The second rib 40 is also spaced from the trailing edge to define a third or trailing edge channel 46 therebetween for channeling yet another portion of the cooling air during operation. The cooling air may be suitably provided to the three channels through corresponding inlets in the outer band 22 as shown in FIGS. 1 and 3.

As initially shown in FIG. 2, each vane 18 includes a plurality of rows of corresponding film cooling holes, designated 1–13, extending through the pressure and suction sidewalls in flow communication with respective ones of the three channels 42,44,46 for providing improved film cooling in accordance with the present invention for decreasing vane temperature and thermal gradients for substantially increasing the durability and life of the nozzle vanes. The various film cooling holes extend generally in straight lines along the spans of the vanes in the radial direction.

But for the improved pattern and configuration of the film holes 1–13 illustrated in FIGS. 1–3, the turbine nozzle illustrated therein is conventional and representative of the high pressure turbine nozzle found in the CF34 engine identified above. As indicated above, extensive field experience of that engine has revealed localized thermal distress in the turbine nozzle due to the pattern and configuration of the existing film cooling holes therein. From this field experience and extensive analysis thereof, an improved pattern and configuration of the film holes has been discovered as a substantial improvement over the existing nozzle design for improving the durability and life thereof about three fold.

As illustrated in FIGS. 2 and 3, the first partition rib 38 extends radially outwardly from the inner band 20 and stops short of the air inlet through the outer band 22. The first rib 38 is radially oriented without significant inclination or slope.

The second partition rib 40 extends radially inwardly from the air inlets at the outer band 22 and stops short of the inner band 20. The second rib 40 is sloped at an inclination angle A relative to the radial axis, with the inner end of the rib being disposed further aft than the outer end of the rib. In this configuration, the first rib 38 separates the first and second air channels 42,44 which receive the cooling air 24 from a common inlet in the outer band.

The inside of the first channel 42 is preferably smooth for channeling the cooling air therethrough without obstruction. The inside of the second channel 44 is also preferably smooth except for a row of short, linear turbulators 48, as shown in FIG. 2, which trip the cooling air as it flows radially inwardly for enhancing the heat transfer cooling in this region of the pressure sidewall 26.

The third channel 46 includes a bank of longitudinally and chordally spaced apart pins 50 extending integrally between the opposite pressure and suction sidewalls 26,28 for increasing the cooling effectiveness of the air along the tapering trailing edge region of the vane fed with cooling air by the third channel 46.

The ribs 38,40 and channels 42–46 are the same as those found in the existing CF34 nozzle.

The film holes in each vane 18 are arranged in different groups corresponding with the different cooling requirements of the airfoil-shaped pressure and suction sidewalls between the leading and trailing edges. A first group includes four rows of film cooling gill holes 1,2,3,12 extending through the suction sidewall 28 in flow communication with respective ones of the first and second channels 42,44. As shown in FIGS. 1 and 3, the four gill rows extend in straight lines along the span of the vane along the first rib 38.

The four gill rows illustrated in FIG. 2 are spaced apart chordally along the suction sidewall from just aft of the leading edge to the maximum thickness of the vane. A single gill row 1 is joined in flow communication to the second channel 44 just aft of the first rib 38 for receiving cooling air. And, three rows 2,3,12 are joined in flow communication to the first channel 42 upstream or forward of the first rib 38 for receiving cooling air from this channel.

As shown in FIGS. 1 and 2, each vane also includes four rows of film cooling holes arranged in a showerhead extending in straight lines along the span of the vane at the leading edge 34. The four showerhead rows 4,5,6,7 are spaced laterally apart around the leading edge along both the pressure and suction sidewalls thereat.

As shown in FIGS. 2 and 3, the film holes include another group of four rows of film cooling flank holes 8,9,10,13 extending through the pressure sidewall 26 in flow communication with respective ones of the first, second, and third channels 42,44,46.

The mid-chord row of flank holes 8 is joined in flow communication with the second channel 44 for receiving air therefrom. The two aft rows of flank holes 9,10 are joined in flow communication with the third channel 46 for receiving cooling air therefrom. And, the forward row of flank holes 13 is joined in flow communication with the first channel 42 for receiving cooling air therefrom.

As shown in FIGS. 2 and 3, each vane also includes a row of trailing edge holes 11 extending along the trailing edge 36, and joined in flow communication with the third channel 46 for receiving cooling air therefrom. The trailing edge holes 11 extend axially between the opposite pressure and suction sides and have outlets spaced just forward of the trailing edge 36 for discharging a final film of cooling air therealong.

As indicated above, due to the airfoil shape of the vanes, the vanes are subject to heating from the combustion gases which acts differently around the perimeter of the vane. Accordingly, the film cooling holes must be precisely configured and positioned for reducing undesirable temperature gradients during operation and minimizing the temperature of local hot spots for enhancing the durability of the vanes during operation.

In particular, the three rows of flank holes 8,9,10 are preferably inclined along the span of each vane at different slopes or inclination angles B,C. The improved configuration of the three rows of flank holes 8,9,10 decreases the axial temperature gradient along the pressure sidewall to the trailing edge for increasing durability.

As shown in FIG. 3, the second rib 40 is sloped at the inclination angle A, and the mid-chord row of flank holes 8 joins the second channel 44 just upstream of the second rib and has a slope B preferably equal to the slope A of the second rib for discharging the cooling air in a film over the pressure sidewall along the second rib.

Flank holes 8 cooperate with the downstream row of flank holes 9 which are radially aligned with a slope C which is smaller than the slope B of the upstream row of flank holes 8, and is also smaller than the slope A of the second rib 40. In FIG. 3 the various rows of film cooling holes are radially aligned in generally straight lines indicated in phantom.

The last downstream row of flank holes 10 has a slope which is smaller than the slope C of the intermediate row flank holes 9 and joins the third channel 46 directly aft of the intermediate flank holes 9. The slope of the last flank row 10 is preferably zero which indicates the longitudinal alignment thereof with a radial axis of the nozzle.

Since the cold rib 40 illustrated in FIG. 3 is sloped relative to the radial axis, as well as relative to the generally radially aligned trailing edge 36, it is desirable to vary the relative orientation or slopes of the three rows of flank holes 8,9,10 to better distribute film cooling air to reduce the temperature gradients axially along the pressure side flank of the vane which is relatively hot compared with the relatively cold second rib 40. In a preferred embodiment, the slope C of the intermediate row of flank holes 9 is preferably the average value of the slopes of the next upstream row of flank holes 8 and the next downstream row of flank holes 10.

In view of the sloping of the mid-chord row of flank holes 8, the fourth row of flank holes 13 is provided upstream therefrom in flow communication with the first channel 42 and along the first rib 38. The upstream row of flank holes 13 is preferably substantially parallel to the first rib 38 and has a generally zero slope.

The pattern and configuration of the thirteen rows of film cooling holes 1–13 illustrated in the figures may be evaluated in comparison with the previous CF34 nozzle design showing thermal distress over years of commercial use in a large number of engines sold and operated during that time.

The following table lists additional differences between the past CF34 design and the improved, upgraded design in accordance with a preferred embodiment of the present invention. Listed in the table by film hole row are the number of holes per row and their diameter in mils and millimeters.

| Film-Hole Row | Past CF34 Design | Upgrade Vane 18 |
| --- | --- | --- |
| 1 | 7 @ 20 mils (0.51 mm) | 10 @ 20 mils |
| 2 | 14 @ 23 mils (0.58 mm) | 14 @ 23 mils |
| 3 | 14 @ 23 mils | 14 @ 23 mils |
| 12 | none | 15 @ 18 mils (0.46 mm) |
| 4 | 13 @ 20 mils | 16 @ 15 mils |
| 5 | 14 @ 20 mils | 15 @ 18 mils |
| 6 | 14 @ 20 mils | 15 @ 18 mils |
| 7 | 16 @ 20 mils | 16 @ 18 mils |
| 13 | none | 16 @ 18 mils |
| 8 | 11 @ 31.5 mils (0.8 mm) | 16 @ 18 mils |
| 9 | 10 @ 20 mils | 12 @ 18 mils |
| 10 | 11 @ 17 mils (0.43 mm) | 11 @ 18 mils |
| 11 | slot holes | no change |

As listed in the table, the fourth row of gill holes 12 has been added between the leading edge and the three downstream rows of gill holes 1–3 to better cool and reduce temperature gradients on the vane suction side aft of the leading edge.

The first, upstream row of gill holes 12 are smaller in diameter than the larger grill holes 1–3 downstream therefrom. The size and number of gill holes 2, 3 are conventional, with the row of gill holes 3 being shifted forwardly toward the leading edge to better cooperate with the added row of gill holes 12. The aft row of gill holes 1 has been shifted slightly aft from the first rib in view of the improved cooling provided by the three upstream rows of gill holes.

The number of gill holes 1 is increased slightly near the vane root for extending the film layer. This extension of the row of gill holes 1 to the root of the vane provides additional cooling to enhance the life of the vane trailing edge. By improving the durability of the trailing edge, engine performance deterioration will also be reduced.

The diameter of the showerhead holes 4–7 has been decreased to reduce the amount of cooling air discharged therefrom, with the showerhead holes having substantially equal diameters with the four rows of flank holes 8–10, 13. The ad holes 4–7 have a radially inward inclination angle D shown in FIG. 3 about $20_E$ for being substantially steeper than in the previous design having about $45_E$.

The modification of the showerhead holes 4–7 effects equivalent metal temperatures compared to the past design, while reducing cooling airflow therethrough. The reduced diameter of the showerhead holes and the steeper surface angle thereof enhances cooling effectiveness so that less cooling air is required therefor, with the cooling air being diverted to the other film holes. The other holes are correspondingly sized so that the total amount of cooling air required for all the film cooling rows in each vane is substantially the same as the previous design.

As indicated in the table, the three rows of flank holes 8,9,10 have been substantially reduced in diameter for reducing cooling airflow therethrough which cooperates with the preferred slopes of these three rows. And, the forward row of flank holes 13 has been added to cooperate with the three downstream flank rows for reducing the temperature gradient along the airfoil pressure sidewall.

The film cooling flank holes 8,9,10 are substantially reduced in diameter compared to the previous design, and are now substantially equal in diameter, and are also equal in diameter to the added row of flank holes 13.

The four rows of flank holes 8–10, 13 now cooperate with the pressure sidewall and the relatively cold ribs 38,40 and pins 50 to substantially reduce the temperature gradient along the pressure sidewall for enhancing vane durability. The forward and aft rows of flank holes 13,10 are generally aligned radially in the vane, whereas the intermediate rows of flank holes 8,9 are sloped to cooperate with the sloping second rib 40.

The mid-chord row of flank holes 8 matches the slope of the second rib in the preferred embodiment, with the slope of the next downstream row of flank holes 9 having an average value between the upstream and downstream rows of flank holes.

If desired, one or more additional rows of the film cooling flank holes may be added, and would preferably have intermediate slopes. For the three rows 8,9,10, the slope of the middle row is simply the average slope of the two adjoining rows. And, for four rows of flank holes (not shown) the slope of the second intermediate row would differ from the first row by one third of the sum of the slopes of the two outer rows, with the third row also differing in slope from the fourth row by one third the value of the slope sum.

The improved nozzle vane 18 enjoys enhance durability and life by the careful combination of film cooling holes made possible by extensive field experience and analysis.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured letters patent of the United States is the invention as defined and differentiated in the following claims in which we claim:

What is claimed is:

1. A turbine nozzle comprising:
   a plurality of vanes integrally joined at opposite ends to inner and outer bands;
   each of said vanes including opposite pressure and suction sidewalls extending in span longitudinally between said bands and chordally between leading and trailing edges;
   said sidewalls being spaced apart between said leading and trailing edges, and further including a first rib spaced from said leading edge and integrally joined to said sidewalls to define a first channel for channeling cooling air, and a second rib spaced from said first rib and integrally joined to said sidewalls to define a second channel for channeling cooling air, and said second rib is spaced from said trailing edge to define a third channel for channeling cooling air, and
   a plurality of rows of film cooling flank holes extending through said pressure sidewall in flow communication with said second and third channels, and being inclined along said span at different slopes.

2. A nozzle according to claim 1 wherein said second rib is sloped, and a first one of said flank rows has a slope generally equal thereto and joins said second channel.

3. A nozzle according to claim 2 wherein a second one of said flank rows has a slope smaller than said first row slope and joins said third channel.

4. A nozzle according to claim 3 wherein a third one of said flank rows has a slope smaller than said second row slope and joins said third channel aft of said second flank row.

5. A nozzle according to claim 4 wherein said first and third row slopes have an average slope, and said second row slope is substantially equal to said average slope.

6. A nozzle according to claim 4 wherein said film cooling holes in said first, second, and third flank rows have substantially equal diameters.

7. A nozzle according to claim 4 wherein each of said vanes further comprises a row of film cooling flank holes extending through said pressure sidewall in flow communication with said first channel and along said first rib.

8. A nozzle according to claim 7 wherein said first-rib flank row is substantially parallel to said first rib, and said holes thereof are substantially equal in diameter to said holes of said first, second, and third flank rows.

9. A nozzle according to claim 4 wherein each of said vanes further comprises a plurality of rows of film cooling holes arranged in a showerhead extending in span along said leading edge.

10. A nozzle according to claim 9 wherein said showerhead holes include four rows spaced apart around said leading edge along both said pressure and suction sidewalls.

11. A nozzle according to claim 10 wherein said showerhead holes are substantially equal in diameter with said flank holes.

12. A nozzle according to claim 4 wherein each of said vanes further comprises a plurality of rows of film cooling gill holes extending through said suction sidewall in flow communication with said first and second channels, and extending in span along said first rib.

13. A nozzle according to claim 12 wherein said gill rows include four rows spaced chordally apart along said suction sidewall.

14. A nozzle according to claim 13 wherein said gill rows include three rows joined to said first channel, and a single row joined to said second channel.

15. A nozzle according to claim 14 wherein said gill rows include a first, upstream row having holes smaller in diameter than gill holes downstream therefrom.

16. A nozzle according to claim 4 wherein each of said vanes further comprises a row of trailing edge holes extending along said trailing edge, and joined to said third channel.

17. A turbine nozzle vane comprising:
   pressure and suction sidewalls extending in span from root to tip, and in chord between leading and trailing edges;
   said sidewalls being spaced apart, and including an integral first rib spaced from said leading edge to define a first channel, and an integral second rib spaced from said first rib to define a second channel, and spaced from said trailing edge to define a third channel; and a plurality of rows of film cooling holes extending through said pressure and suction sidewalls in flow communication with said first, second, and third channels, and including three rows of flank holes in said pressure sidewall being inclined along said span at different slopes.

18. A vane according to claim 17 wherein said film holes are arranged in different groups including:

rows of gill holes extending through said suction sidewall in flow communication with said first and second channels, along said first rib;

rows of showerhead holes spaced apart around said leading edge along both said pressure and suction sidewalls; and said three rows of flank holes joined to said second and third channels.

19. A vane according to claim 18 further comprising:

three rows of said gill holes joined to said first channel upstream of said first rib, and a single fourth row of said gill holes joined to said second channel downstream from said first rib;

four rows of said showerhead holes; and a fourth row of said flank holes extending through said pressure sidewall in flow communication with said first channel along said first rib.

20. A vane according to claim 19 further comprising:

a row of trailing edge holes extending along said trailing edge, and joined to said third channel; and a bank of longitudinally and chordally spaced apart pins extending integrally between said pressure and suction sidewalls inside said third channel.

* * * * *